United States Patent
Dobson, Jr. et al.

(10) Patent No.: US 11,462,877 B2
(45) Date of Patent: Oct. 4, 2022

(54) DIE CLEARANCE MONITORING SYSTEM FOR A CRIMPING DEVICE

(71) Applicant: TE CONNECTIVITY CORPORATION, Berwyn, PA (US)

(72) Inventors: Richard R. Dobson, Jr., Palmyra, PA (US); Matthew John Orlowski, Harrisburg, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 747 days.

(21) Appl. No.: 16/448,220

(22) Filed: Jun. 21, 2019

(65) Prior Publication Data
US 2020/0036151 A1    Jan. 30, 2020

Related U.S. Application Data

(60) Provisional application No. 62/711,130, filed on Jul. 27, 2018.

(51) Int. Cl.
*H01R 43/048* (2006.01)
*B30B 15/00* (2006.01)

(52) U.S. Cl.
CPC ..... *H01R 43/0488* (2013.01); *B30B 15/0094* (2013.01); *H01R 43/0482* (2013.01); *Y10T 29/53235* (2015.01)

(58) Field of Classification Search
CPC ............... H01R 43/042; H01R 43/048; H01R 43/0488; H01R 43/055; H01R 43/058; Y10T 29/49185; Y10T 29/53065; Y10T 29/53235; B30B 15/0029; B30B 15/0094; G01V 8/12; G01V 8/20
See application file for complete search history.

(56) References Cited

U.S. PATENT DOCUMENTS

| | | | |
|---|---|---|---|
| 4,107,539 A * | 8/1978 | Kirsch | G01V 8/20 356/621 |
| 9,548,580 B2 | 1/2017 | Hallman et al. | |
| 9,871,335 B2 | 1/2018 | Deck | |
| 2012/0314226 A1* | 12/2012 | Kelly | G01B 11/00 29/709 |
| 2016/0329675 A1 | 11/2016 | Horiki | |

FOREIGN PATENT DOCUMENTS

WO    2014009466 A2    1/2014

OTHER PUBLICATIONS

European Search Report, European Application No. 19187597.0, International Filing Date, Jul. 22, 2019.

* cited by examiner

*Primary Examiner* — Peter Dungba Vo
*Assistant Examiner* — Joshua D Anderson (57) ABSTRACT

A die clearance monitoring system includes a light source, a light detector, and a controller. The light source is disposed along a front side of a die set of a crimping device and emits light towards the die set. The die set includes a first crimp die and a second crimp die that engage and crimp an object along a crimp stroke. The light detector is disposed along a rear side of the die set. The light detector receives the emitted light from the light source that traverses across the die set through a gap defined between the first and second crimp dies and generates light absorption data based on the emitted light that is received. The controller is communicatively connected to the light detector. The controller processes the light absorption data to determine a relative spacing between the first crimp die and the second crimp die.

20 Claims, 6 Drawing Sheets

DIE CLEARANCE MONITORING SYSTEM FOR A CRIMPING DEVICE

CROSS-REFERENCE TO RELATED APPLICATIONS

This application claims priority to U.S. Provisional Application No. 62/711,130, filed 27 Jul. 2018, titled "Die Clearance Monitoring System for a Crimping Device," which is incorporated by reference herein in its entirety.

BACKGROUND OF THE INVENTION

The subject matter herein relates generally to crimping devices that have die sets for crimping objects, such as terminals and ferrules.

Terminals are typically crimped onto wires by means of a crimping device, such as a press or hand tool, having a die set including two crimp dies that are movable relative to one another for crimping the terminals. In operation, a terminal is placed on one crimp die that supports the terminal, and an end of a wire is inserted into a ferrule or barrel of the terminal. The other crimp die moves towards the terminal on the first crimp die to the limit of the stroke of the device. Along the stroke, the terminal is squeezed between the crimp dies to deform and secure the terminal onto the wire, producing a crimped terminal assembly. The moving crimp die is then retracted to its starting point.

The crimped terminal assemblies produced by the crimping device may be subject to strict specifications or standards. In order to repeatably produce crimped terminals that meet the specification, the crimp dies must be accurately mounted on the crimping device relative to one another to provide a designated type and extent of deformation of the terminal onto the wire. For example, misalignment of the crimp dies by a few thousandths of an inch could result in crimped terminal assemblies that fail to satisfy the specifications and have to be discarded.

Many crimping devices are used to repetitively produce a multitude of identical crimped terminal assemblies. Due to the forces involved and the number of repetitions, the crimp dies on the crimping devices may gradually migrate from the designated set positions, eventually producing crimped terminal assemblies that fail to meet the specification if left unchecked for a sufficient amount of time. With known crimping devices, operators manually perform spot checks at given intervals, such as once a day or once every two hours, to determine whether the crimp dies are properly positioned and aligned. For example, some die sets are bottoming die sets that are considered properly positioned and aligned when the dies have bottomed, meaning that the top and bottom dies physically touch each other with zero clearance at a flat mating surface upon reaching a bottom dead position of the crimp stroke. Furthermore, some die sets are non-bottoming, and the crimp dies may be considered properly positioned and aligned when there is a specific designated physical separation or gap between the top and bottom die at the bottom dead position of the crimp stroke. The manual inspections may involve inserting thin shims between the crimp dies. The manual inspections are relatively inaccurate considering inherent human error and the tight clearances involved (e.g., thousandths of an inch). Also, the manual inspections are inefficient, requiring the crimping device to temporarily halt operation on a regular basis to enable the operator to perform the inspection.

A need remains for a system for automated monitoring of the crimp dies during operation to efficiently and consistently produce crimped terminal assemblies that satisfy designated specifications.

BRIEF DESCRIPTION OF THE INVENTION

In one or more embodiments, a die clearance monitoring system is provided that includes a light source, a light detector, and a controller including one or more processors. The light source is disposed along a front side of a die set of a crimping device and emits light towards the die set. The die set includes a first crimp die and a second crimp die that have respective forming surfaces engaging an object to crimp the object as at least one of the first and second crimp dies moves along a crimp stroke relative to the other crimp die. The light detector is disposed along a rear side of the die set that is opposite the front side. The light detector receives the emitted light from the light source that traverses across the die set through a gap defined between the first and second crimp dies and generates light absorption data based on the emitted light that is received. The controller is communicatively connected to the light detector. The controller processes the light absorption data to determine a relative spacing between the first crimp die and the second crimp die.

In one or more embodiments, a crimping device is provided that includes a die set and a die clearance monitoring system. The die set includes first crimp die and a second crimp die. The die set has a front side and a rear side opposite the front side. Each of the first and second crimp dies has a respective forming surface and a respective contact surface laterally adjacent to the forming surface. The forming surfaces engage an object to crimp the object as at least one of the first and second crimp dies moves along a crimp stroke relative to the other crimp die. The contact surface of the first crimp die aligns with and faces the contact surface of the second crimp die. The die clearance monitoring system comprises a light source and a light detector. The light source is disposed along the front side of the die set and emits light towards the die set. The light detector is disposed along the rear side of the die set and receives the emitted light from the light source that traverses across the die set through a gap defined between the contact surfaces of the first and second crimp dies. The light detector generates light absorption data based on the emitted light that is received.

DETAILED DESCRIPTION OF THE INVENTION

Embodiments of the present disclosure provide a die clearance monitoring system for a crimping device and a crimping device that incorporates the die clearance monitoring system. The die clearance monitoring system utilizes the transmission of light (e.g., electromagnetic radiation) to detect the clearance or spacing between mating crimp dies of a die set of the crimping device. For example, photons of light may be emitted from one side or end of the die set, and a detector on the opposite side or end of the die set measures an amount of the light that traverses across the die set between the mating crimp dies. Based on the amount of light received by the detector across the die set, the die clearance monitoring system determines the relative spacing (e.g., a size of a clearance gap) between the crimp dies.

At least one technical effect of the embodiments of the die clearance monitoring system disclosed herein is the ability to receive timely feedback even during operation of the crimping device. For example, the die clearance monitoring system can provide feedback to an operator for every crimp stroke of the dies. The operator may be notified immediately if the crimp dies become misaligned (e.g., do not bottom out or do not reach a specific designated separation distance at a bottom dead position of the crimp stroke). The die clearance monitoring system allows for immediate operator feedback for an in-process quality inspection of a properly completed crimp or incomplete crimp on every cycle of operation. As a result of the immediate feedback, maintenance can be performed to realign the crimp dies instead of producing a multitude of defective crimped terminal assemblies that fail to meet specifications before determining that the crimp dies are misaligned via a manual inspection. Another technical effect of the die clearance monitoring system is increased accuracy and efficiency by eliminating or at least reducing the reliance on periodic manual inspections of the crimping device. The die clearance monitoring system may provide more accurate clearance measurements than manual methods which typically involve inserting mechanical shims between the crimp dies. The die clearance monitoring system may also increase efficiency because the measurements can be obtained during operation, thereby eliminating or at least reducing the frequency of inspection stoppages. In addition to determining whether the crimp dies are properly positioned and aligned for quality control, the clearance or spacing information obtained by the die clearance monitoring system may be useful for various other applications and tasks, such as for counting and tracking the number of crimp strokes or cycles. In another example, the die clearance monitoring system may enable determining when a crimping process is complete, which may be more accurate and/or timely than relying on the time required for a set pressure or force to be achieved by the crimping apparatus. As a result, the cycle time for the termination may decrease and the operational efficiency may improve relative to termination systems that do not monitor the die clearance in real-time.

Figure 1:
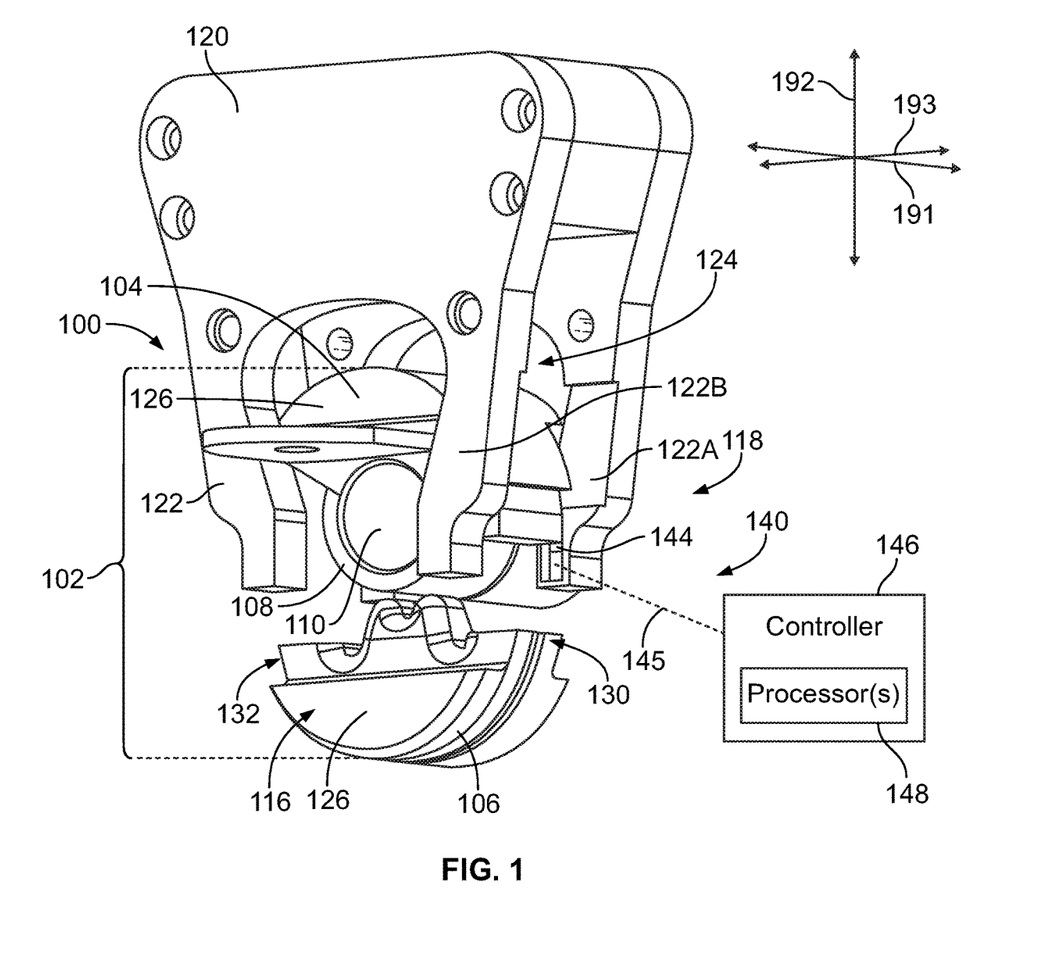
FIG. 1 is a front perspective view of a portion of a crimping device according to an embodiment.
Figure 2:
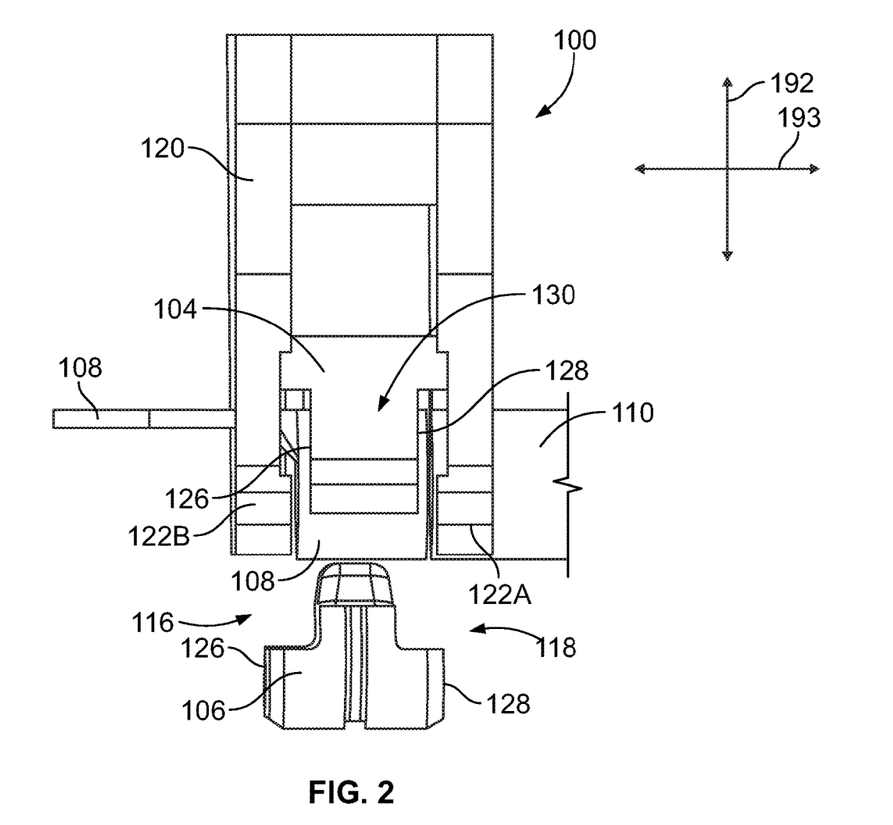
FIG. 2 is a side view of the portion of the crimping device shown in FIG. 1.

FIG. 1 is a front perspective view of a portion of a crimping device 100 according to an embodiment. FIG. 2 is a side view of the crimping device 100 shown in FIG. 1. The crimping device 100 has a die set 102 that includes a first crimp die 104 and a second crimp die 106. The crimping device 100 is configured to crimp objects, such as terminals 108, onto wires 110 to produce crimped assemblies for use in electrical devices, such as electrical connectors. In the illustrated embodiment, a terminal 108 and a wire 110 are disposed between the first and second crimp dies 104, 106. The crimp dies 104, 106 move relative to each other along a crimp stroke. The relative movement may be accomplished by the first crimp die 104 moving towards the second crimp die 106 which remains stationary, the second crimp die 106 moving towards the first crimp die 104 which remains stationary, or both crimp dies 104, 106 moving towards each other at the same time. As the relative spacing between the crimp dies 104, 106 decreases along the crimp stroke, the crimp dies 104, 106 sandwich the terminal 108 and compress the terminal 108 around the wire 110. The deformation of the terminal 108 mechanically secures the terminal 108 onto the wire 110 and electrically connects the terminal 108 to the wire 110, producing a crimped assembly. Although FIGS. 1 and 2 show a terminal 108 loaded in the crimping device 100, the crimping device 100 optionally may be utilized to crimp objects (e.g., work pieces) other than terminals, such as ferrules, sheaths, bushings, sleeves, bands, stubs, or the like.

The illustrated portion of the crimping device 100 also includes a frame 120. The frame 120 has multiple frame members 122 that define a cavity 124. The die set 102 is disposed at least partially within the cavity 124 of the frame 120. For example, the first crimp die 104 is disposed within the cavity 124, and the second crimp die 106 is outside of the cavity 124 in FIGS. 1 and 2.

The crimping device 100 may be a bench machine that has an automated applicator. For example, the second crimp die 106 may be coupled to a movable ram of the applicator that moves the crimp die 106 along the crimp stroke relative to the first crimp die 104. Alternatively, the first crimp die 104 may be coupled to the movable ram. In an alternative embodiment, the crimping device 100 may be another type of crimping device, such as a lead maker, a hand tool, or the like. For example, the crimping device 100 may have handles (not shown) mechanically coupled to the die set 102 and the frame 120 to allow an operator to grasp and manipulate the crimping device 100. It is noted that the die clearance monitoring system 140 disclosed herein can be utilized across multiple crimping platforms and devices, including but not limited to applicators, manual hand tools, powered hand tools, bench terminators, and the like.

The crimping device 100 is oriented with respect to a lateral axis 191, a height axis 192, and a longitudinal axis 193. The axes 191-193 are mutually perpendicular. Although the height axis 192 appears to extend in a vertical direction parallel to gravity in FIGS. 1 and 2, it is understood that the axes 191-193 are not required to have any particular orientation with respect to gravity. The height axis 192 represents a crimp axis because at least one of the crimp dies 104, 106 moves along (e.g., parallel to) the height axis 192 during the crimp stroke.

Based on the orientation of the crimping device 100 in the illustrated embodiment, the first crimp die 104 is referred to herein as an upper crimp die 104 and the second crimp die 106 is referred to herein as a lower crimp die 106. The die set 102 has a front side 116 and a rear side 118 that is opposite the front side 116. The front side 116 of the die set 102 is defined by respective front faces 126 of the two crimp dies 104, 106. The rear side 118 is defined by respective rear faces 128 of the crimp dies 104, 106. The die set 102 has a first end 130 and a second end 132 that is opposite the first end 130. The first and second ends 130, 132 are lateral ends spaced apart along the lateral axis 191. As used herein, relative or spatial terms such as "front," "rear," "upper," "lower," "interior," and "exterior," are only used to identify and distinguish the referenced elements in the illustrated orientations and do not necessarily require particular positions or orientations relative to gravity and/or the surrounding environment of the crimping device 100.

The crimping device 100 also includes a die clearance monitoring system 140 that monitors a relative spacing or clearance between the upper and lower crimp dies 104, 106 using light. The die clearance monitoring system 140, as shown in more detail herein, includes a light source 142 (shown in FIG. 5), a light detector 144, and a controller 146 that has one or more processors 148. The light detector 144 receives (e.g., absorbs) light that is emitted by the light source 142 across the die set 102 from the light detector 144. In the illustrated embodiment, the light detector 144 is disposed along the rear side 118 of the die set 102, such that the light detector 144 is at or rearward of the rear side 118. The light detector 144 is mounted to one of the frame members 122A rearward of the die set 102 at or near the first end 130 in the illustrated embodiment, but may be mounted to another component of the crimping device 100 in another embodiment, such as to one of the crimp dies 104, 106 or a component that holds the crimp dies 104, 106. Although not shown in FIGS. 1 and 2, the light source 142 is mounted across from the light detector 144. For example, the light source 142 may be mounted on the frame member 122B that is in front of the die set 102 at the first end 130.

In at least one embodiment, the light detector 144 generates light absorption data based on the emitted light from the light source 142 that is received by the light detector 144 across the die set 102. For example, the light absorption data may represent an amount (e.g., concentration, intensity, etc.), property (e.g., wavelength, frequency, polarization, etc.), and/or the like of the light that impinges upon and is absorbed by the light detector 144.

The controller 146 is communicatively connected to the light detector 144 via a wired or wireless communication pathway 145. The controller 146 includes or represents one or more processors 148 and/or other logic-based device(s) that perform operations based on instructions stored on a tangible and non-transitory computer readable storage medium or memory. The controller 146 may additionally or alternatively include one or more hard-wired devices that perform operations based on hard-wired logic of the devices. The controller 146 may represent the hardware that operates based on software or hardwired instructions, the software that directs hardware to perform the operations, or a combination thereof. The controller 146 receives the light absorption data generated by the light detector 144 and processes or analyzes the light absorption data. By processing the light absorption data, the controller 146 determines a relative spacing (or clearance) between the upper and lower crimp dies 104, 106.

The die clearance monitoring system 140 may continuously monitor the relative spacing between the crimp dies 104, 106 during operation of the crimping device 100. For example, the die clearance monitoring system 140 can track the relative movement and relative positioning of the crimp dies 104, 106 during the crimp stroke that crimps the terminal 108 onto the wire 110. Based on the spacing information, the controller 146 may provide insights into the quality of the crimp, update a count that tracks the number of crimp strokes, and/or the like.

Figure 3:
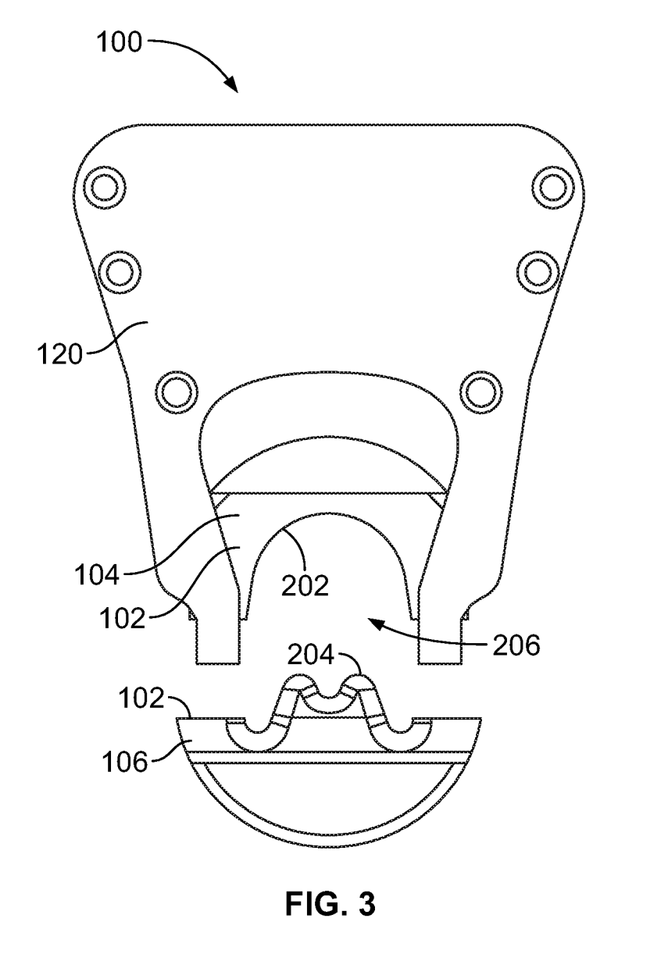
FIG. 3 is a front view of the portion of the crimping device shown in FIGS. 1 and 2 showing a die set at a first position along a crimp stroke.
Figure 4:
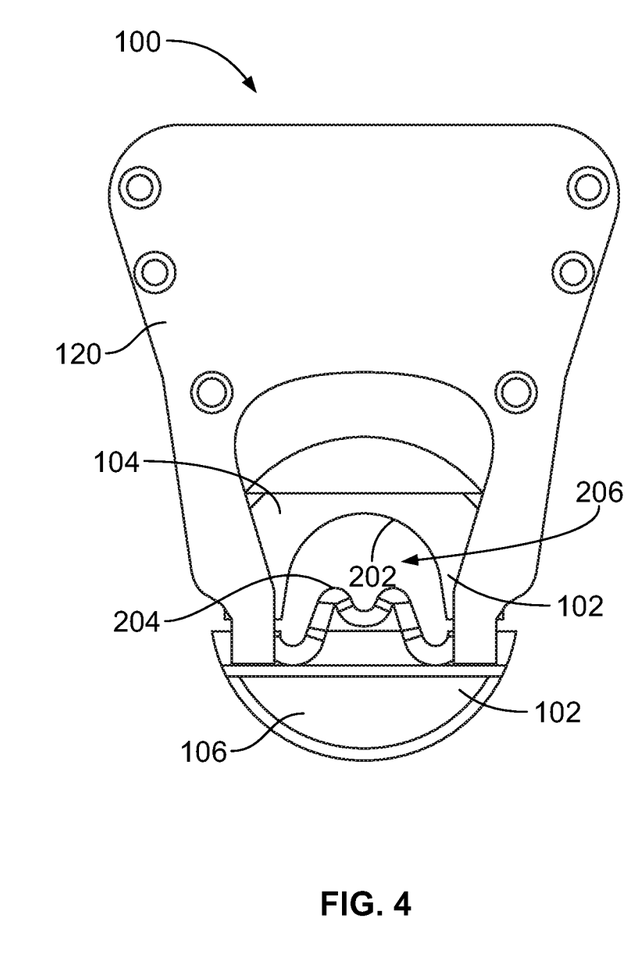
FIG. 4 is a front view of the portion of the crimping device showing the die set at a second position along the crimp stroke.

FIG. 3 is a front view of the portion of the crimping device 100 shown in FIGS. 1 and 2 showing the die set 102 at a first position along the crimp stroke. FIG. 4 is a front view of the portion of the crimping device 100 showing the die set 102 at a second position along the crimp stroke. The electrical terminal 108 and wire 110 are omitted in FIGS. 3 and 4. The die set 102 crimps the terminal 108 to the wire 110 during the crimp stroke. The crimp stroke has both a closing component and an opening component. The crimping of the terminal 108 occurs during the closing component. In the illustrated embodiment, the lower crimp die 106 moves relative to the upper crimp die 104 and the frame 120 during the crimp stroke. The upper crimp die 104 is stationary relative to the frame 120. The movement of the lower crimp die 106 may be propelled by a driving mechanism which may be coupled to handles (for a manual hand tool) or a motor (for a powered applicator). In an alternative embodiment, the upper crimp die 104 may move relative to the lower crimp die 106 and the frame 120 during the crimp stroke, or both crimp dies 104, 106 may move relative to the frame 120.

The crimp stroke begins at the first position shown in FIG. 3, which represents an initial starting position. The terminal 108 and wire 110 (shown in FIGS. 1 and 2) are loaded between the crimp dies 104, 106 when the die set 102 is in the initial starting position. After the terminal 108 and wire 110 are loaded, the closing component begins as the lower crimp die 106 is driven toward the upper crimp die 104 and the frame 120. A crimp phase of the closing component begins upon both of the crimp dies 104, 106 simultaneously engaging the terminal 108. During the crimp phase, the crimp dies 104, 106 compress and pinch the terminal 108 therebetween. The terminal 108 deforms (e.g., folds or rolls) inward into and around the wire 110. The closing component of the crimp stroke ends once the lower crimp die 106 reaches a bottom dead position, which represents the closest relative positioning of the two crimp dies 104, 106 during the crimp stroke.

In an embodiment, the lower crimp die 106 is configured to engage and abut against the upper crimp die 104 at the bottom dead position. For example, the crimp dies 104, 106 may be bottoming dies that achieve a full crimp when there is no clearance between the dies 104, 106. The second position of the die set 102 shown in FIG. 4 may represent a position proximate to, but not at, the bottom dead position because the crimp dies 104, 106 are not in abutment.

In an alternative embodiment, the crimp dies 104, 106 are non-bottoming dies that remain spaced apart from one another when in the bottom dead position. For example, in such an alternative embodiment, the second position shown in FIG. 4 may represent the bottom dead position. As described herein, the die clearance monitoring system 140 can be used to determine whether non-bottoming dies are properly aligned during a crimp stroke by measuring the separation distance or clearance between the dies at the bottom dead position and comparing the measured separation distance to a specific designated value that represents an aligned die set.

Each of the crimp dies 104, 106 includes a forming surface 202, 204, respectively, that engages the terminal 108 during the crimping operation. The forming surfaces 202, 204 control the deformation of the terminal 108, including the way that the portions of the terminal 108 are folded or rolled and the extent that the terminal 108 is compressed. The forming surface 202 of the upper crimp die 104 has a curved profile that is an arch shape (e.g., an inverted U-shape). The forming surface 202 is recessed or concave relative to the lower crimp die 106. The forming surface 204 of the lower crimp die 106 has a double-arched curved profile that resembles an M-shape. The forming surface 204 projects outward towards the upper crimp die 104. One or both of the forming surfaces 202, 204 may have other shapes in other embodiments.

The die set 102 defines a crimping zone 206 between the two forming surfaces 202, 204. The terminal 108 and wire 110 are received within the crimping zone 206. As shown in FIGS. 3 and 4, the height of the crimping zone 206 is greater at the first or initial starting position of the die set 102 than at the second position of the die set 102 at or proximate to the bottom dead position.

After reaching the bottom dead position, the opening component of the crimp stroke begins and the lower crimp die 106 starts to move away from the upper crimp die 104 back towards the initial starting position shown in FIG. 3. As the lower crimp die 106 moves, the lower crimp die 106 eventually releases or separates from the terminal 108. The lower crimp die 106 returning to the initial starting position indicates the end of the crimp stroke. At this stage, the crimped terminal assembly can be removed from the crimping zone 206 and another terminal 108 and wire 110 loaded into the crimping zone 206 in preparation for a subsequent crimp stroke.

Figure 5:
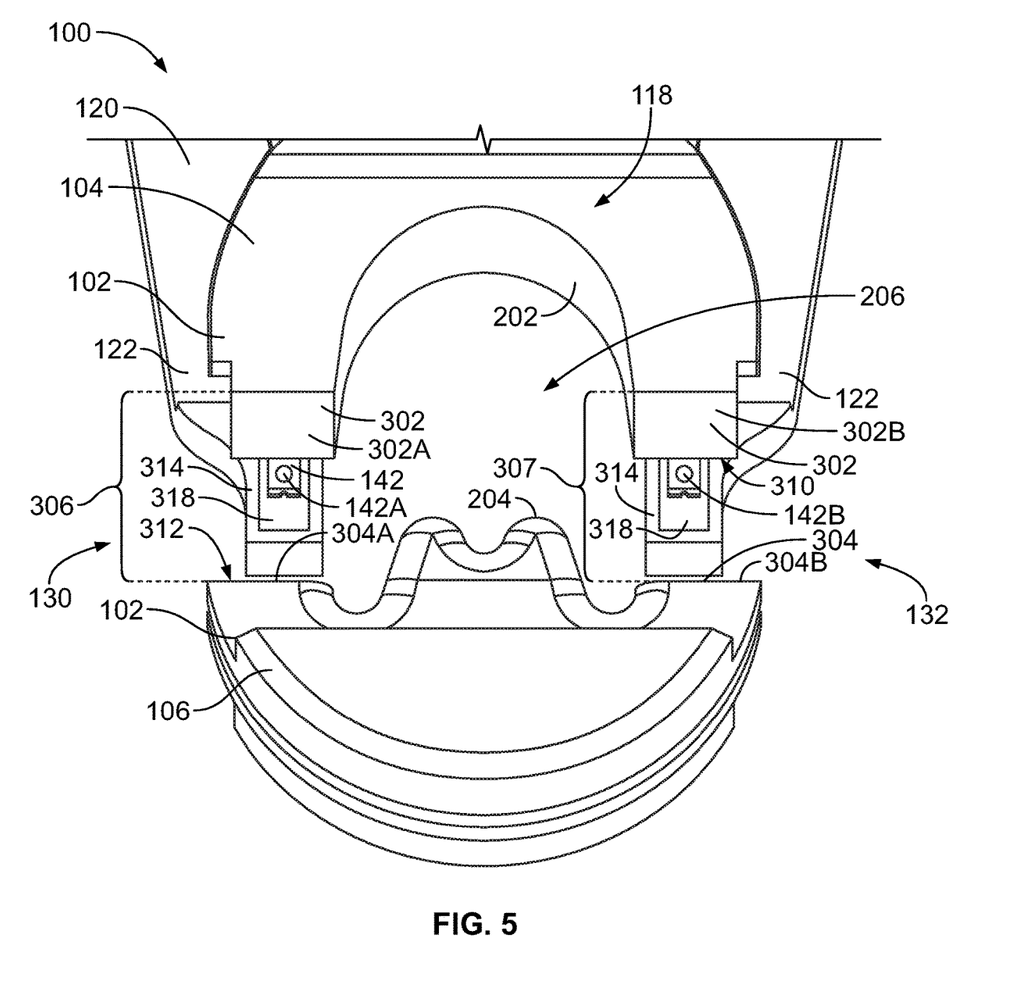
FIG. 5 is a rear perspective view of a portion of the crimping device showing the die set in the initial starting position.

FIG. 5 is a rear perspective view of a portion of the crimping device 100 showing the die set 102 in the initial starting position. In the illustrated embodiment, two of the frame members 122 of the frame 120 along the rear side 118 of the die set 102 are omitted for clarity to show the upper crimp die 104. The two frame members 122 along the front side 116 (shown in FIG. 2) are shown behind the upper crimp die 104 in FIG. 5. The upper crimp die 104 has at least one contact surface 302 that is laterally adjacent to the forming surface 202 thereof. The lower crimp die 106 also has at least one contact surface 304 that is laterally adjacent to the forming surface 204 thereof. Each contact surface 302 of the upper crimp die 104 faces and aligns with a corresponding contact surface 304 of the lower crimp die 106.

In the illustrated embodiment, the upper crimp die 104 has two contact surfaces 302A, 302B. The forming surface 202 is laterally disposed between the two contact surfaces 302A, 302B. The contact surfaces 302A, 302B are located along a crimp end 310 of the upper crimp die 104, which is a bottom end in the illustrated orientation. The forming surface 202 is recessed from the crimp end 310. The first contact surface 302A is between the forming surface 202 and the first end 130 of the die set 102, and the second contact surface 302B is between the forming surface 202 and the second end 132. In the illustrated orientation, the first contact surface 302A is a left contact surface 302A, and the second contact surface 302B is a right contact surface 302B. Similarly, the lower crimp die 106 has two contact surfaces 304, including a first, or left, contact surface 304A that aligns with the left contact surface 302A and a second, or right, contact surface 304B that aligns with the right contact surface 302B. The forming surface 204 is laterally disposed between the two contact surfaces 304A, 304B. The contact surfaces 304A, 304B are located along a crimp end 312 of the lower crimp die 106, which is a top end in the illustrated orientation. The forming surface 204 projects beyond the crimp end 312 towards the upper crimp die 104.

A gap 306 is defined between the left contact surfaces 302A, 304A. A gap 307 is defined between the right contact surfaces 302B, 304B. The height of the gaps 306, 307 varies during the crimp stroke. For example, the gaps 306, 307 are greater (e.g., taller) when the die set 102 is in the initial starting position than at the bottom dead position. In the illustrated embodiment, the die set 102 is a bottoming die set. The die set 102 is arranged and configured for the contact surfaces 302A, 302B to engage and abut against the corresponding contact surfaces 304A, 304B at the bottom dead position of the crimp stroke. When the die set 102 is properly aligned and positioned, there should not be either of the gaps between the contact surfaces 302, 304, when at the bottom dead position. For example, the left contact surface 302A should abut the left contact surface 304A to define a seam at the contact interface without any gap. If, on the other hand, the crimp dies 104, 106 are misaligned, then there may still be one or both gaps 306, 307 when the die set 102 is in the bottom dead position. It is possible for there to be only one of the gaps 306, 307 at the bottom dead position if the crimp dies 104, 106 are misaligned and tilted relative to one another.

In the illustrated embodiment, the die clearance monitoring system 140 (shown in FIG. 1) includes two light sources 142. The light sources 142 are mounted to the frame members 122 shown in FIG. 5. The light sources 142 are disposed on or embedded within an inner surface 314 of each of the frame members 122. The inner surface 314 faces the die set 102. Optionally, the light sources 142 may be recessed from the inner surfaces 314 within pockets 316 (shown in FIG. 6) defined in the frame members 122. The light sources 142 may be mounted on a substrate 318, such as a printed circuit board that has light generation circuitry.

The light sources 142 emit light towards the die set 102. In the illustrated embodiment, a first light source 142A of the two light sources 142 is laterally aligned with the left contact surfaces 302A, 304A and emits light towards the contact surfaces 302A, 304A and the gap 306 therebetween. At least some of the light emitted by the first light source 142A may traverse across the die set 102 through the gap 306, and be received by a light detector 144 of the die clearance monitoring system 140 on the other side of the die set 102. The second light source 142B is laterally aligned with the right contact surfaces 302B, 304B and emits light towards the contact surfaces 302B, 304B and the gap 307 therebetween. At least some of the light emitted by the second light source 142B may traverse across the die set 102 through the gap 307, and be received by a light detector 144 on the other side of the die set 102.

As shown in FIG. 5, the light sources 142A, 142B are laterally spaced apart from the crimping zone 206. A terminal 108 and/or wire 110 (shown in FIG. 1) within the crimping zone 206 does not interfere with the die clearance monitoring system 140 because at least some of the light is directed through the gaps 306, 307 that are spaced apart from the crimping zone 206. The die clearance monitoring system 140 may be operable regardless of the presence or absence of a terminal 108 or another object in the crimping zone 206. It is recognized that the die clearance monitoring system 140 may have more or less than two light sources 142 in another embodiment.

Figure 6:
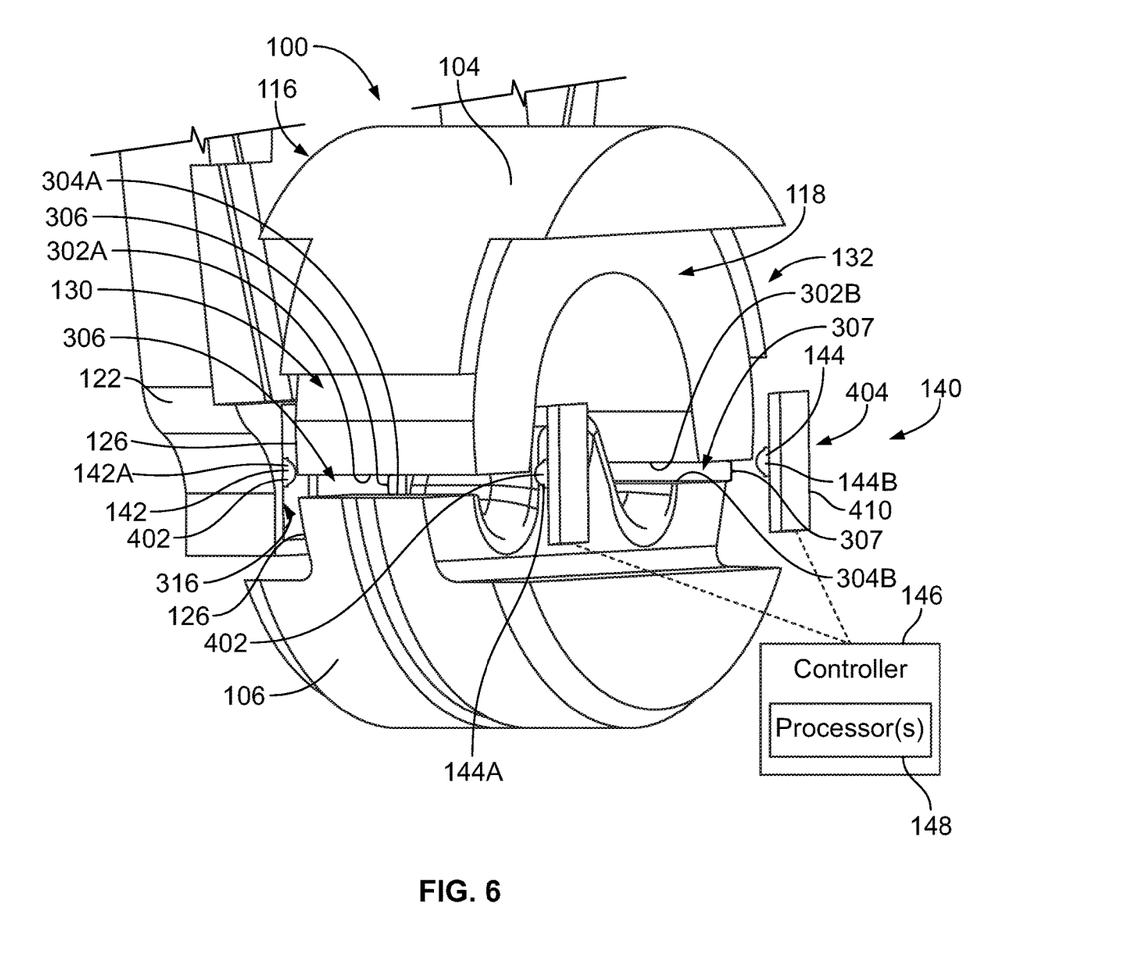
FIG. 6 is a rear side perspective view of a portion of the crimping device showing the die set at a position proximate to a bottom dead position of the crimp stroke.

FIG. 6 is a rear side perspective view of a portion of the crimping device 100 showing the die set 102 at a position proximate to the bottom dead position of the crimp stroke. FIG. 6 shows two light detectors 144 of the die clearance monitoring system 140. The light detectors 144 are disposed along the rear side 118 of the die set 102. In at least one embodiment, the light detectors 144 are mounted to frame members 122 of the frame 120, as shown in FIG. 1, but those frame members 122 are omitted from FIG. 6 to show other components. Therefore, although the light detectors 144 appear to be free-floating in FIG. 6, the light detectors 144 are secured in place to the frame 120. The light detectors 144 may be mounted on substrates 410, such as printed circuit boards that have associated circuitry.

The light detectors 144 are positioned to receive the light emitted by the light sources 142 that is conveyed across the die set 102 through the gaps 306, 307. For example, as shown in FIG. 6, the light detectors 144 and the light sources 142 are disposed along opposite sides of the die set 102. The light sources 142 are located along the front side 116 and the light detectors 144 are along the rear side 118, but the arrangement may be flipped in an alternative embodiment. Furthermore, the two light detectors 144 need not both be on the same side, as the die clearance monitoring system 140 may have one light source 142 and one detector 144 along the front side 116 and the other light source 142 and detector 144 along the rear side 118.

In the illustrated embodiment, a first (e.g., left) detector 144A of the light detectors 144 aligns with the gap 306 and is configured to receive the light emitted by the left light source 142A through the gap 306. The left detector 144A aligns across from the left light source 142A, representing a left sensor set 402. The left detector 144A generates light absorption data based on the emitted light that is received (e.g., absorbed), and the light absorption data is communicated to the controller 146 for processing. The light absorption data generated by the left detector 144A is used to determine the relative spacing at the gap 306 between the left contact surfaces 302A, 304A, and whether the contact surfaces 302A, 304A abut one another at the bottom dead position of the crimp stroke.

A second (e.g., right) detector 144B of the light detectors 144 aligns with the gap 307 and is configured to receive the light emitted by the right light source 142B (shown in FIG. 5) through the gap 307. The right detector 144B and right light source 142B represent a right sensor set 404. The right detector 144B generates light absorption data based on the light received by the right detector 144B, which is also communicated to the controller 146 for processing. The light absorption data generated by the right detector 144B is used to determine the relative spacing at the gap 307 between the right contact surfaces 302B, 304B, and whether the contact surfaces 302B, 304B abut one another at the bottom dead position of the crimp stroke.

The left and right sensor sets 402, 404 allow for independently monitoring the relative spacing or clearance between the crimp dies 104, 106 (e.g., the height of the gaps 306, 307) at each of the two lateral ends 130, 132. For example, the use of both sensor sets 402, 404 allows the die clearance monitoring system 140 to detect whether both ends 130, 132 of the die set 102 bottom out when in the bottom dead position of the crimp stroke, neither end 130, 132 bottoms out, or only one of the two ends 130, 132 bottoms out. In an alternative crimping device in which it is unlikely or impossible for the crimp dies 104, 106 to tilt relative to one another, such that only one of the two ends 130, 132 bottoms out, the die clearance monitoring system 140 may have only a single light source 142 and a single light detected 144 instead of the two sets 402, 404. Furthermore, the die clearance monitoring system 140 may have more than the two sets 402, 404 in another embodiment.

In the illustrated embodiment, the light sources 142 are mounted to the frame 120 at generally the same height as the contact surfaces 302A, 302B of the upper crimp die 104. The light sources 142 may be slightly below the contact surfaces 302A, 302B to align with the area of the gaps 306, 307 immediately below the contact surfaces 302A, 302B. As described above, the upper crimp die 104 may not move relative to the frame 120 during the crimp stroke, so the light sources 142 remain generally aligned with the contact surfaces 302A, 302B throughout the crimp stroke. The emitted light is directed towards the contact surfaces 302A, 302B such that some of the light emitted by the light sources 142 impinges upon the front face 126 of the crimp die 104 while another portion of the emitted light propagates under the contact surfaces 302A, 302B through the respective gaps 306, 307. Some of the emitted light from the light sources 142 may impinge upon the front face 126 of the lower crimp die 106. The amount of light that impinges upon the front face 126 of the lower crimp die 106 increases as the lower crimp die 106 moves closer to the upper crimp die 104 during the crimp stroke because the gaps 306, 307 shorten. The light detectors 144 may have fixed positions relative to the light sources 142, and may generally be at the same height as the light sources 142. For example, the light detectors 144 may generally align with the contact surfaces 302A, 302B of the upper crimp die 104, such as being positioned slightly below the contact surfaces 302A, 302B.

In at least one embodiment, the light sources 142 and the light detectors 144 of the die clearance monitoring system 140 are both light emitting diodes (LEDs). For example, the light detectors 144 may be reverse-biased LEDs configured to absorb light, rather than emit light. In an embodiment, each light source 142 emits light at a designated wavelength, which may represent a peak wavelength. The designated wavelength of each light source 142 may be in the visible range (e.g., between about 390 nm and about 700 nm), infrared range, or the ultraviolet range. Different light sources 142 may have different designated wavelengths. The reverse-biased LEDs that represent the light detectors 144 may have a respective peak wavelength that is greater than the designated wavelengths of the light emitted by the light sources 142. For example, the peak wavelength of the light detectors 144 may be within 100 nm greater than the designated wavelengths of the light sources 142. In a non-limiting example, the light source 142A may be a blue LED that emits light at a designated wavelength of 470 nm, and the light detector 144A that detects the emitted light from the light source 142A may be a reverse-biased green LED with a peak wavelength greater than 470 nm but less than 570 nm. The reverse-biased green LED functions as a low-cost detector that not only detects the blue light but also filters out ambient light of different wavelengths. Thus, the reverse-biased LED is both a detector and filter in one.

A reverse-biased LED can be modeled as a capacitor in parallel with a current source. The capacitance is achieved by the physics of the LED construction, which involves the migration of holes and electrons within a P region and an N region of the LED. As the blue light pulses from the light source 142, a reverse current flows through the LED representing the light detector 144, causing the capacitor of the light detector LED to discharge. The discharge current may be amplified by a two-stage amplifier. As the light source 142 starts to emit blue light, the reverse-biased light detector 144 starts to discharge. Once the light source 142 ceases to emit blue light, the light detector 144 starts to charge. The measure of this rise/fall time is proportional to the amount of light received by the light detector 144. The amount of light received is affected by the size of the gaps 306, 307 between the crimp dies 104, 106. Therefore, the size of the gaps 306, 307 affects the measured rise/fall time of the light detector circuit. The light absorption data generated by the light detector 144 and communicated to the controller 146 may include the measured rise/fall times. The controller 146 may correlate the rise/fall times with a physical relative spacing between the crimp dies 104, 106 to determine the relative spacing at different times.

It is recognized that the light sources 142 and light detectors 144 are not limited to blue and green colors. For example, the light source 142A may be a green LED and the light detector 144B may be a reverse-biased yellow LED (having a peak wavelength greater than the wavelength of the green light). In an alternative embodiment, the light sources 142 and/or the light detectors 144 may not be LEDs. For example, the light detectors 144 may be light sensors that are not LEDs, such as photoresistors, phototransistors, and/or the like. In another example, the light sources 142 may be light emitting devices other than LEDs, such as incandescent bulbs, compact fluorescent lamps, and/or the like.

Figure 7:
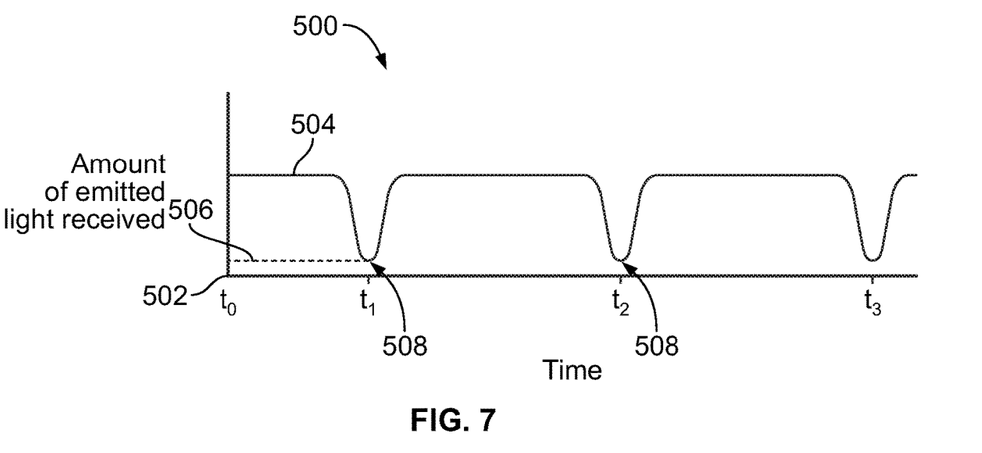
FIG. 7 is a graph showing an amount of emitted light received by a light detector of a die clearance monitoring system over time during multiple crimp strokes of the crimping device.

With continued reference to FIG. 6, FIG. 7 is a graph 500 showing an amount of emitted light 504 received by one of the light detectors 144 over time during multiple crimp strokes of the crimping device 100. The emitted light refers to light generated and emitted by one of the light sources 142. The origin 502 may represent that none of the emitted light is received by the light detector 144. The times $t_1$, $t_2$, and $t_3$ represent instances that the die set 102 is in the bottom dead position. As shown in the graph 500, as the die set 102 approaches the bottom dead position, the amount of emitted light 504 from the light source 142 that traverses across the die set 102 and is received at the light detector 144 decreases. The decrease is attributable to the narrowing of the gaps 306, 307 during the closing component of the crimp stroke, which causes a greater proportion of the emitted light to be blocked by the crimp dies 104, 106 instead of traversing the gaps 306, 307 between the dies 104, 106. The amount of emitted light 504 then quickly increases as the crimp dies 104, 106 move apart during the opening component of the crimp stroke.

In the illustrated embodiment, the amount of emitted light 504 received at the light detector 144 when at the bottom dead position (e.g., at times $t_1$, $t_2$, and $t_3$) is at a non-zero level 506, indicating that at least some emitted light continuously traverses through the respective gap 306, 307 throughout an entirety at the crimp stroke. For a die set 102 designed to bottom out, this amount of light indicates that the crimp dies 104, 106 are misaligned because the presence of emitted light at the light detector 144 indicates that the contact surfaces 302, 304 are not properly abutting when at the bottom dead position to block the propagation of light across the die set 102.

The light detector 144 is configured to generate light absorption data that is communicated to the controller 146 for processing. The light absorption data may represent or indicate the amount of emitted light received by the light detector 144 over time, similar to what is depicted in the graph 500. If the light detector 144 associated with the graph 500 is the left detector 144A, the controller 146 may process the amount of light at the non-zero level 506 and detect that the left contact surface 302A of the upper crimp die 104 is not abutting the left contact surface 304A of the lower crimp die 106 at the bottom dead position. In response, the controller 146 may be configured to automatically generate a control signal that notifies an operator, schedules maintenance for the crimping device 100, or the like. For example, the control signal may cause an alert message that is transmitted to computer or smart phone of an operator to notify the operator that the crimp dies 104, 106 are misaligned. The controller 146 may generate a control signal that causes the crimping device 100 to shut down temporarily until maintenance can be performed, which prevents the production of any crimped assemblies that fail to meet requirements and specifications due to the misaligned crimp dies 104, 106.

If, on the other hand, the graph 500 associated with the left detector 144A indicates that the amount of emitted light 504 drops all the way to zero (e.g., the origin 502), it would indicate that left contact surfaces 302A, 304B of the crimp dies 104, 106 abut one another at the bottom dead position, blocking the propagation of light across the die set 102. Upon processing this light absorption data, the controller 146 may determine that the crimp dies 104, 106 are properly aligned, such that the crimping device 100 would be expected to produce crimped assemblies that satisfy requirements and specifications. In response, the controller 146 optionally may take no action or may log a record in a database that the crimp dies 104, 106 at the given time are determined to be properly aligned.

Although FIG. 7 represents the light received by one light detector 144, it is recognized that each of the two light detectors 144A, 144B in the illustrated embodiment generates light absorption data that is communicated to the controller 146 for processing. By processing both sets of light absorption data, the controller 146 can determine if the crimp dies 104, 106 are tilted. For example, the controller 146 is able to detect if the left contact surfaces 302A, 304A abut one another at the bottom dead position while the right contact surfaces 302B, 304B do not abut one another.

The controller 146 can determine the times at which the die set 102 reaches the bottom dead position in the crimp stroke based on the amount of emitted light 504 received by a given light detector 144 over time. As shown in FIG. 7, the bottom dead position is associated with a nadir 508 or lowest point in the plot line, which may occur at a common interval. Alternatively, other characteristics of the plot line can be calculated to signify the amount of light received or absorbed by the detector 144, such as the rise and fall times, the slopes, or the like. The controller 146 can utilize this information for various metrics, such as for counting the number of crimp strokes, determining the duration of each crimp stroke, and the like.

Figure 8:
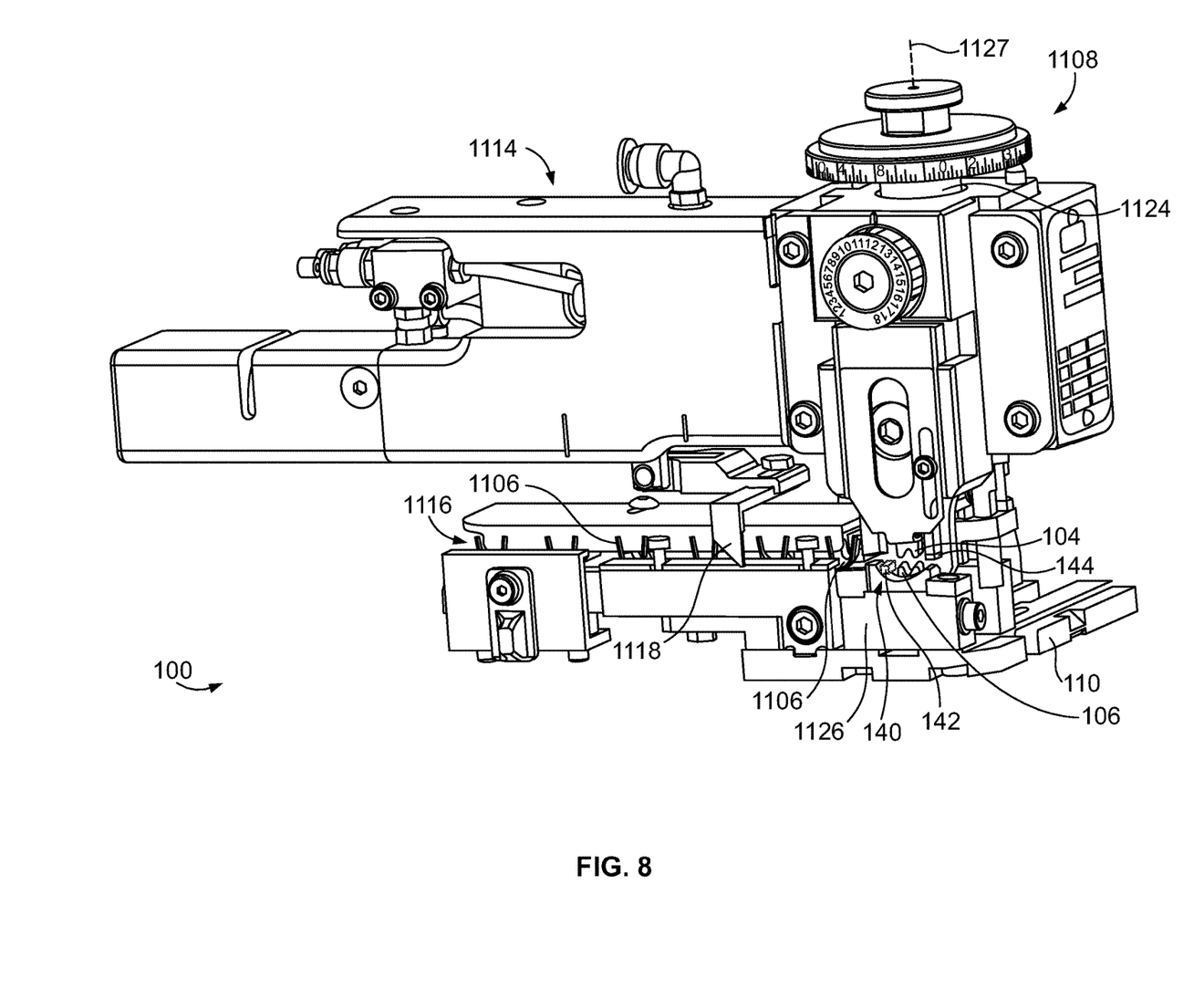
FIG. 8 is a perspective view of the crimping device according to an embodiment.

FIG. 8 is a perspective view of the crimping device 100 according to an embodiment. In the illustrated embodiment, the crimping device 100 is a terminator or press that includes an applicator 1108 and a feeder 1114. Although a powered applicator crimping device 100 is shown in FIG. 8, it is noted that the die clearance monitoring system 140 disclosed herein can be utilized across multiple crimping platforms and devices, including other automated bench systems and manual and/or powered hand tools.

The applicator 1108 includes a movable ram 1124 and a base 1126. The ram 1124 is actuated or driven through the crimp stroke by a driving mechanism, such as a motor. The ram 1124 moves relative to the base 1126 along a crimp axis 1127. The upper crimp die 104 is coupled to the ram 1124 in the illustrated embodiment, such that the upper crimp die 104 moves with the ram 1124 along the crimp stroke. The lower crimp die 106 is coupled to the base 1126 and remains stationary during the crimp stroke. The light source 142 and the light detector 144 of the die clearance monitoring system 140 are mounted to the applicator 1108 on opposite sides of the crimp dies 104, 106.

The feeder 1114 is coupled to the applicator 1108 and is used to feed the terminals 1106, or other objects, to the crimp dies 104, 106 for crimping. The feeder 1114 may be an electrically actuated feeder, a pneumatic feeder, a cam and linkage feeder, or the like. The terminals 1106 may be coupled together to form a terminal strip 1116. The feeder 1114 includes a feeder arm 1118 that engages the terminal strip 1116 to advance the terminal strip 1116 towards the crimp dies 104, 106.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. Dimensions, types of materials, orientations of the various components, and the number and positions of the various components described herein are intended to define parameters of certain embodiments, and are by no means limiting and are merely example embodiments. Many other embodiments and modifications within the spirit and scope of the claims will be apparent to those of ordinary skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A die clearance monitoring system for a crimping device, the crimping device including a die set disposed inside of a frame of the crimping device, the die set including a first crimp die and a second crimp die that have respective forming surfaces that engage an object to crimp the object as at least one of the first and second crimp dies moves along a crimp stroke relative to the other crimp die, the die clearance monitoring system comprising:
    a light source disposed on the crimping device at a front side of the die set of the crimping device, the light source emitting light towards the die set;
    a light detector disposed on the crimping device at a rear side of the die set that is opposite the front side, the light detector receiving the emitted light from the light source that traverses across the die set through a gap defined between the first and second crimp dies and generating light absorption data based on the emitted light that is received during the crimp stroke; and
    a controller including one or more processors communicatively connected to the light detector, the controller processing the light absorption data to determine a relative spacing between the first crimp die and the second crimp die during the crimp stroke.

2. The die clearance monitoring system of claim 1, wherein the light absorption data indicates an amount of the emitted light that is received by the light detector, and the controller processes the light absorption data to determine the relative spacing between the first and second crimp dies based on the amount of the emitted light that is received by the light detector.

3. The die clearance monitoring system of claim 1, wherein each of the first crimp die and the second crimp die has a respective contact surface laterally adjacent to the respective forming surface thereof, wherein the contact surfaces define the gap through which the emitted light that is received by the light detector traverses across the die set.

4. The die clearance monitoring system of claim 1, wherein the forming surface of each of the first and second crimp dies is laterally disposed between left and right contact surfaces of the respective crimp die, the left contact surface of the first crimp die aligning with and facing the left contact surface of the second crimp die, the right contact surface of the first crimp die aligning with and facing the right contact surface of the second crimp die, wherein the gap through which the emitted light that is received by the light detector traverses across the die set is defined between the left contact surfaces or the right contact surfaces.

5. The die clearance monitoring system of claim 4, wherein the light source and the light detector represent a left sensor set and the die monitoring system further comprises a right sensor set identical to the left sensor set, wherein the light source of the left sensor set is disposed left of the forming surfaces and directs the light that is emitted therefrom towards at least one of the left contact surfaces, wherein a light source of the right sensor set is disposed right of the forming surfaces and directs light that is emitted therefrom towards at least one of the right contact surfaces.

6. The die clearance monitoring system of claim 1, wherein the controller determines that a contact surface of the first crimp die abuts a complementary contact surface of the second crimp die during a given time period in response to the light absorption data indicating that the light detector did not receive the emitted light from the light source during the given time period.

7. The die clearance monitoring system of claim 1, wherein the controller determines that a contact surface of the first crimp die does not abut against a complementary contact surface of the second crimp die during a crimp stroke in response to the light absorption data indicating that the light detector continuously received at least some of the emitted light from the light source throughout an entirety of the crimp stroke.

8. The die clearance monitoring system of claim 1, further comprising a frame that includes multiple frame members, the light source mounted on one of the frame members along the front side of the die set, the light detector mounted on another of the frame members along the rear side of the die set, wherein at least one of the first and second crimp dies moves relative to the frame along the crimp stroke.

9. The die clearance monitoring system of claim 1, wherein the light source and the light detector are both light emitting diodes.

10. The die clearance monitoring system of claim 1, wherein the light source emits the light at a first wavelength and the light detector is a light emitting diode with a designated peak wavelength that is greater than the first wavelength of the emitted light, the light detector being reverse-biased to detect the emitted light and filter out ambient light.

11. A crimping device comprising:
    a die set disposed inside of the crimping device, the die set including a first crimp die and a second crimp die, the die set having a front side and a rear side opposite the front side, each of the first and second crimp dies having a respective forming surface and a respective contact surface laterally adjacent to the forming surface, the forming surfaces engaging an object to crimp the object as at least one of the first and second crimp dies moves along a crimp stroke relative to the other crimp die, the contact surface of the first crimp die aligning with and facing the contact surface of the second crimp die; and a die clearance monitoring system comprising a light source and a light detector, the light source disposed on the crimping device at the front side of the die set and emitting light towards the die set, the light detector disposed on the crimping device at the rear side of the die set and receiving the emitted light from the light source that traverses across the die set through a gap defined between the contact surfaces of the first and second crimp dies, the light detector generating light absorption data based on the emitted light that is received during the crimp stroke, wherein a controller including one or more processors is communicatively connected to the light detector and processes the light absorption data to determine a relative spacing between the first crimp die and the second crimp die during the crimp stroke.

12. The crimping device of claim 11, further comprising a frame including multiple frame members, wherein the light source is mounted on one of the frame members along the front side of the die set and the light detector is mounted on another of the frame members along the rear side of the die set, wherein at least one of the first and second crimp dies moves relative to the frame along the crimp stroke.

13. The crimping device of claim 11, wherein the die clearance monitoring system further comprises a controller including one or more processors, wherein the controller is communicatively connected to the light detector and processes the light absorption data to determine a relative spacing between the contact surfaces of the first and second crimp dies.

14. The crimping device of claim 13, wherein the controller determines that the contact surfaces of the first and second crimp dies abut against each other during a given time period in response to the light absorption data indicating that the light detector did not receive the emitted light from the light source during the given time period.

15. The crimping device of claim 13, wherein the controller determines that the contact surfaces of the first and second crimp dies do not abut against each other at a bottom dead position of the crimp stroke in response to the light absorption data indicating that the light detector continuously received at least some of the emitted light from the light source throughout an entirety of the crimp stroke.

16. The crimping device of claim 15, wherein, responsive to determining that the contact surfaces do not abut against each other at the bottom dead position of the crimp stroke, the controller generates a control signal to at least one of notify an operator, stop operation of the crimping device, or schedule maintenance for the crimping device.

17. The crimping device of claim 11, wherein the crimping device includes an applicator that has a movable ram, the movable ram secured to the first crimp die or the second crimp die to move said crimp die along the crimp stroke relative to the other crimp die.

18. The crimping device of claim 11, wherein the gap between the contact surfaces of the first and second dies, through which the light detector receives the emitted light from the light source, is laterally spaced apart from a crimping zone that is defined between the forming surfaces and receives the object.

19. The crimping device of claim 11, wherein the light source and the light detector are both light emitting diodes.

20. The crimping device of claim 11, wherein the light source emits the light at a first wavelength and the light detector is a light emitting diode with a designated peak wavelength that is greater than the first wavelength of the emitted light, the light detector being reverse-biased to detect the emitted light and filter out ambient light.

* * * * *